United States Patent [19]

Oe

[11] Patent Number: 4,936,311

[45] Date of Patent: Jun. 26, 1990

[54] METHOD OF ANALYZING REGIONAL VENTRICULAR FUNCTION UTILIZING CENTERLINE METHOD

[75] Inventor: Mitsuo Oe, Tochigi, Japan

[73] Assignee: Kabushiki Kaisha Toshiba, Kanagawa, Japan

[21] Appl. No.: 382,585

[22] Filed: Jul. 20, 1989

[30] Foreign Application Priority Data

Jul. 27, 1988 [JP] Japan ................. 63-185435

[51] Int. Cl.$^5$ .............................. A61B 5/00
[52] U.S. Cl. .................. 128/695; 128/653 R
[58] Field of Search ............... 128/695, 653, 630, 713

[56] References Cited

U.S. PATENT DOCUMENTS 4,637,400  1/1987  Marcus ................. 128/695

FOREIGN PATENT DOCUMENTS 2447396  4/1976  Fed. Rep. of Germany ...... 128/695

OTHER PUBLICATIONS

Sigwort, U. et al., "Videometric Analysis of Left Ventricular Augiograms", Electromedia No. 2, pp. 38–42, 1976.

Kaneko, T. et al., "Straight Line Approximation for LV Boundary from Cardio Cine Angiogram", IEEE BME Transactions, vol. BME-20, No. 6, Nov. 1973, pp. 413–416.

Santamore, W. P. et al., "Comparative LV Volume Study Methods", IEEE BME Trans., vol. BME-20, No. 6, pp. 417–421, Nov. 1973.

Sheehan et al., "Advantages and Applications of the Centerline Method for Characterizing Regional Ventricular Function," Circulation, vol. 74, No. 2, pp. 293–305, Aug. 1986.

Primary Examiner—Francis Jaworski
Attorney, Agent, or Firm—Finnegan, Henderson, Farabow, Garrett, and Dunner

[57] ABSTRACT

A method of analyzing regional ventricular function utilizing centerline method capable of producing sufficiently natural results in the vicinity of the apex. The method includes the step of drawing a line between the end-diastolic and end-systolic contours, which is converting to an intersection of the end-systolic contour and a major axis joining the apex of the end-diastolic contour and a midpoint of an aortic valve portion of the end-diastolic contour, whenever a line to be drawn between the end-diastolic and end-systolic contour is going to intersect with the major axis. In the method, all the lines to be drawn between the end-diastolic and end-systolic contours are drawn sequentially in a first direction from one end of an aortic valve portion toward an apex for one half of the end-diastolic contour, and in a second direction from another end of the aortic valve portion toward the apex, which is opposite to the first direction, for other half of the end-diastolic contour.

3 Claims, 11 Drawing Sheets

METHOD OF ANALYZING REGIONAL VENTRICULAR FUNCTION UTILIZING CENTERLINE METHOD

BACKGROUND OF THE INVENTION

1. Field of the Invention

The present invention relates to the analysis of regional ventricular function and, more particularly, to the so called the centerline method of regional wall motion analysis which facilitates quantitative assessments of the regional ventricular wall motion.

2. Description of the Background Art

Conventionally, the assessments of the regional ventricular wall motion has depended on a subjective analysis using the contrast ventriculograms. Recently, the poor reproducibility of such qualitative evaluations has led to the development of various quantitative methods for measuring the regional ventricular wall motion.

Among such quantitative methods, the centerline method has attracted much attentions for its sensitivity and specificity in detecting abnormal regional functions as well as for its reliability, as can be seen from 'Advantages and applications of the centerline method for characterizing regional ventricular function' by F. L. Sheehan, et al, Circulation 74, No. 2, pp. 293–305, August 1986, and the references therein.

A detail of the conventional centerline method can be found in this reference, and some of its salient points will be reviewed in relation to the present invention in DETAILED DESCRIPTION OF THE PREFERRED EMBODIMENTS below. Here, one of the major problem encountered by the conventional centerline method will be summarized, without the technical detail.

In short, the essential feature of the centerline method is its use of a centerline with respect to which the lines are drawn between the end-diastolic and end-systolic contours, from which the wall motion is assessed by looking at the variations of the lengths of these lines. This centerline is actually determined from other preliminary lines also drawn between the end-diastolic and end-systolic contours. Thus, in the centerline method, drawing of the lines between the end-diastolic and end-systolic contours, required to be done twice, plays a critical role.

However, cares exercised in drawing these lines in the conventional centerline method has been proved to be inadequate for obtaining the sufficiently natural results, especially in the vicinity of the apex. This insufficient naturalness of the results in the vicinity of the apex has been one of the major limitation on the applicability of the centerline method.

SUMMARY OF THE INVENTION

It is therefore an object of the present invention to provide a method of analyzing regional ventricular function utilizing centerline method capable of producing sufficiently natural results in the vicinity of the apex.

According to one aspect of the present invention there is provided a method of analyzing regional ventricular function utilizing centerline method, comprising the steps of: (a) drawing a first set of lines, which are perpendicular to end-diastolic contour, between end-diastolic and end-systolic contours; (b) drawing a line between the end-diastolic and end-systolic contours, which is converging to an intersection of the end-systolic contour and a major axis joining an apex of the end-diastolic contour and a midpoint of an aortic valve portion of the end-diastolic contour, whenever a certain line to be drawn as one of the first set of lines is going to intersect with the major axis, as a replacement for that certain line; (c) determining a centerline passing through midpoints of the lines drawn at the steps (a) and (b); (d) drawing a second set of lines, which are perpendicular to the centerline, between the end-diastolic and end-systolic contours; (e) drawing a line between the end-diastolic and end-systolic contours, which is converging to an intersection of the end-systolic contour and a major axis joining an apex of the end-diastolic contour and a midpoint of an aortic valve portion of the end-diastolic contour, whenever a certain line to be drawn as one of the second set of lines is going to intersect with the major axis, as a replacement for that certain line; and (f) analyzing regional ventricular function according to lengths of the lines drawn at the steps (d) and (e).

According to another aspect of the present invention there is provided a method of analyzing regional ventricular function utilizing centerline method, comprising the steps of: (a) drawing a first set of lines, which are perpendicular to end-diastolic contour, between end-diastolic and end-systolic contours, the lines being drawn sequentially in a first direction from one end of an aortic valve portion toward an apex for one half of the end-diastolic contour, and in a second direction from another end of the aortic valve portion toward the apex, which is opposite to the first direction, for other half of the end-diastolic contour; (b) determining a centerline passing through midpoints of the first set of lines; (c) drawing a second set of lines, which are perpendicular to the centerline, between the end-diastolic and end-systolic contours, the lines being drawn sequentially in a first direction from one end of an aortic valve portion toward an apex for one half of the end-diastolic contour, and in a second direction from another end of the aortic valve portin toward the apex, which is opposite to the first direction, for other half of the end-diastolic contour; and (d) analyzing regional ventricular function according to lengths of the second set of lines.

Other features and advantages of the present invention will become apparent from the following description taken in conjunction with the accompanying drawings.

DETAILED DESCRIPTION OF THE PREFERRED EMBODIMENTS

Now, the method of analyzing regional ventricular function utilizing centerline method according to the present invention will be explained with references to drawings. Here, sufficient detail will be given for the entire analysis by the centerline method in general so as to enable the proper appreciation of the significance of each step involved and, whenever appropriate, the method of the present invention will be explained in contrast to the conventional method.

Figure 1:
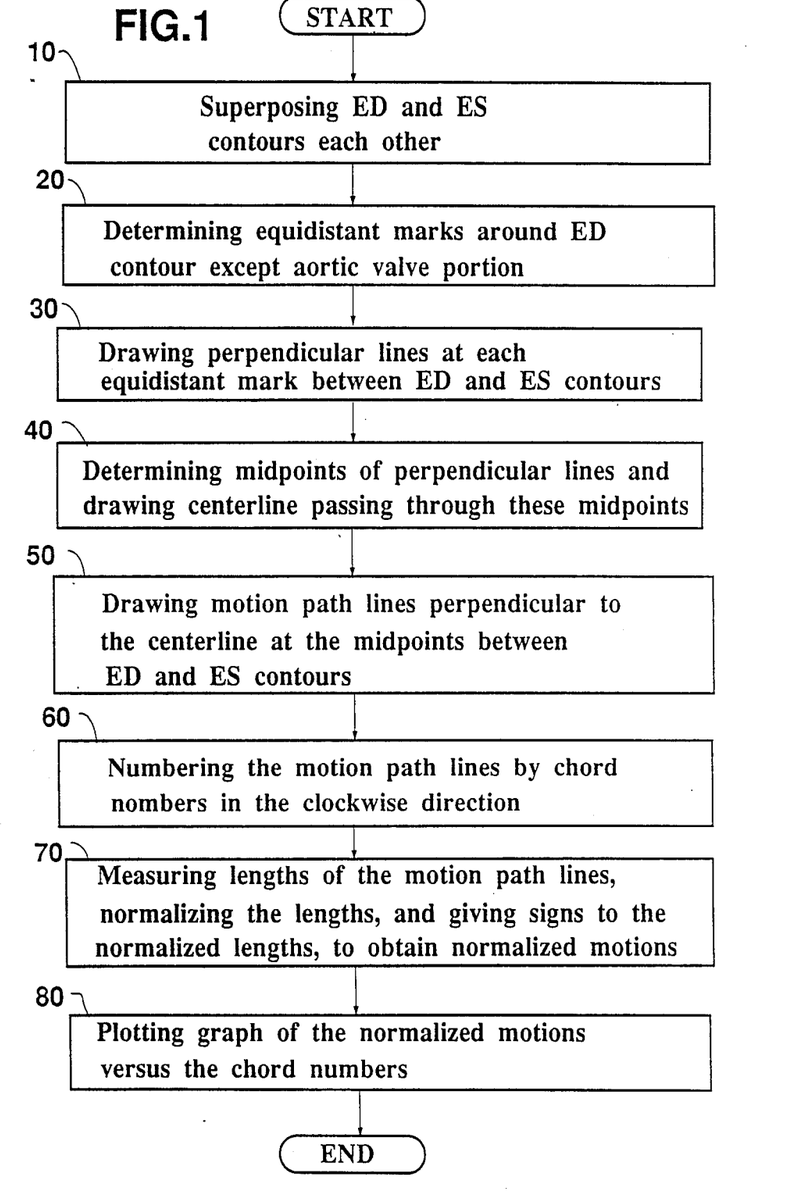
FIG. 1 is a schematic flow chart of the method of analyzing regional ventricular function utilizing centerline method according to the present invention.

Referring now to FIG. 1, there is shown a flow chart which schematically outlines the procedure to be followed in the method of analyzing regional ventricular function utilizing centerline method according to the present invention.

Figure 2:
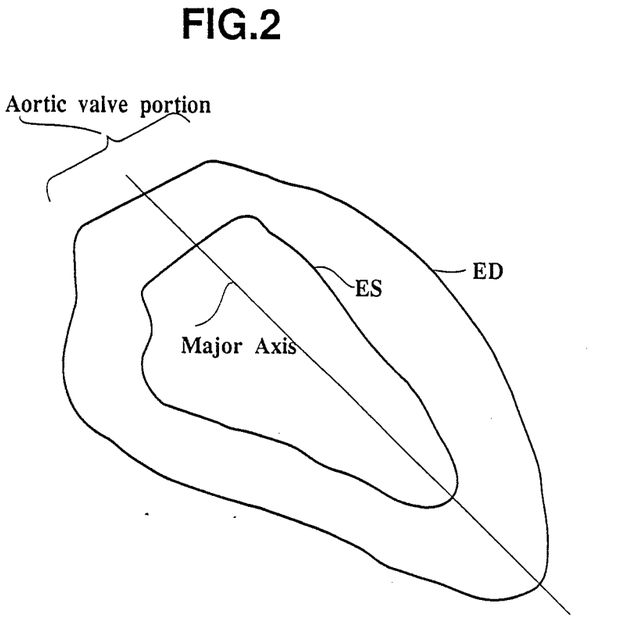
FIG. 2 is an illustration of the end-diastolic and end-systolic contours for explaining the steps in the flow chart of FIG. 1.

In this method, the procedure begins at the step 10 in which the end-diastolic (abbreviated hereafter as ED) and end-systolic (abbreviated hereafter as ES) contours are superposed each other on a single plane, as shown in FIG. 2.

This superposing of ED and ES contours can be achieved in various manners. One possible manner is to take overlapping sequential ventriculograms, and determine ED and ES contours from such overlapping sequential ventriculograms as the largest and smallest contours, respectively. Another possible manner is to take separate ED and ES ventriculograms, and place ED and ES contours obtained from these ventriculograms together on a single plane, in such a way that the major axes joining the apex and the midpoint of the aortic valve portion in each contour are brought together to overlap each other, with the midpoints of the aortic valve portions of two contours being a predetermined distance apart from each other.

Next at the step 20, equidistant marks around ED contour which divide the perimeter of ED contour into 100 equal parts are determined. Here, the number 100 has been chosen for the sake of being definite, and can be changed to some other number.

Figure 3:
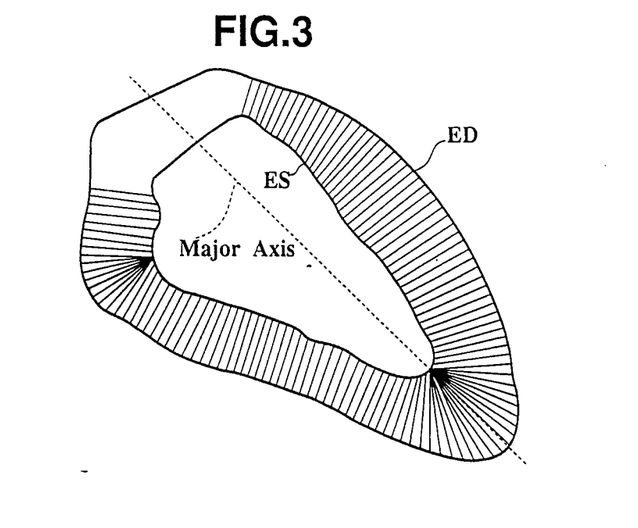
FIG. 3 is another illustration of the end-diastolic and end-systolic contours for explaining the steps in the flow chart of FIG. 1.

Next at the step 30, lines perpendicular to ED contour (referred hereafter as the perpendicular lines) at each of the equidistant marks are drawn between ED and ES contours, as shown in FIG. 3.

The direction perpendicular to ED contour can be determined in various manners. One possible manner is to consider a circle passing through a certain equidistant mark and two adjacent equidistant marks in both sides, and then choose a direction normal to the circle at that certain equidistant mark as the direction perpendicular to ED contour. Another possible manner is to choose an average of the directions from a certain equidistant mark to 20 nearby equidistant marks as the direction perpendicular to ED contour.

Now, in drawing such perpendicular lines, certain cares must be taken. Namely, in the centerline method, these lines are regarded as indicating the motion paths of the regional wall motions, so that each one of these lines starting from ED contour must reach ES contour, in order to be realistic at all. Furthermore, none of these lines should reach the aortic valve portion of ES contour, and no intersection among any of these lines should exist.

To meet such requirements, the following three rules are normally taken into account.

Figure 4:
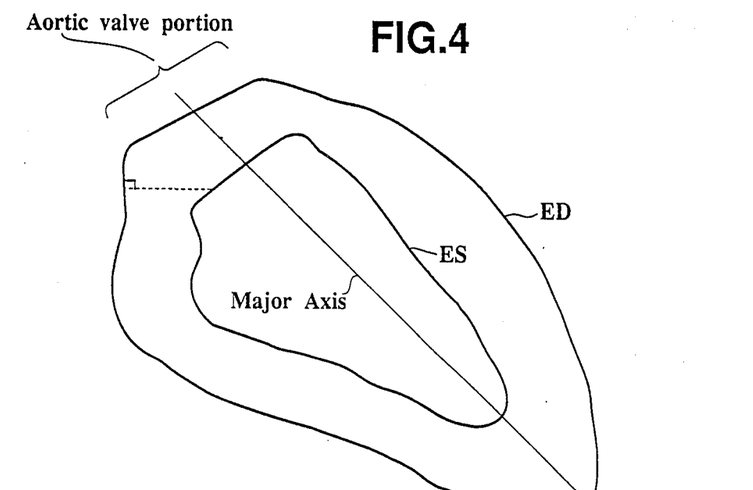
FIG. 4 is another illustration of the end-diastolic and end-systolic contours for explaining the steps in the flow chart of FIG. 1.

(3a) If a perpendicular line from a certain equidistant mark is going to reach the aortic valve portion of ES contour, as shown in FIG. 4, then do not draw that perpendicular line, skip that equidistant mark, and go to next equidistant mark.

Figures 5, 6:
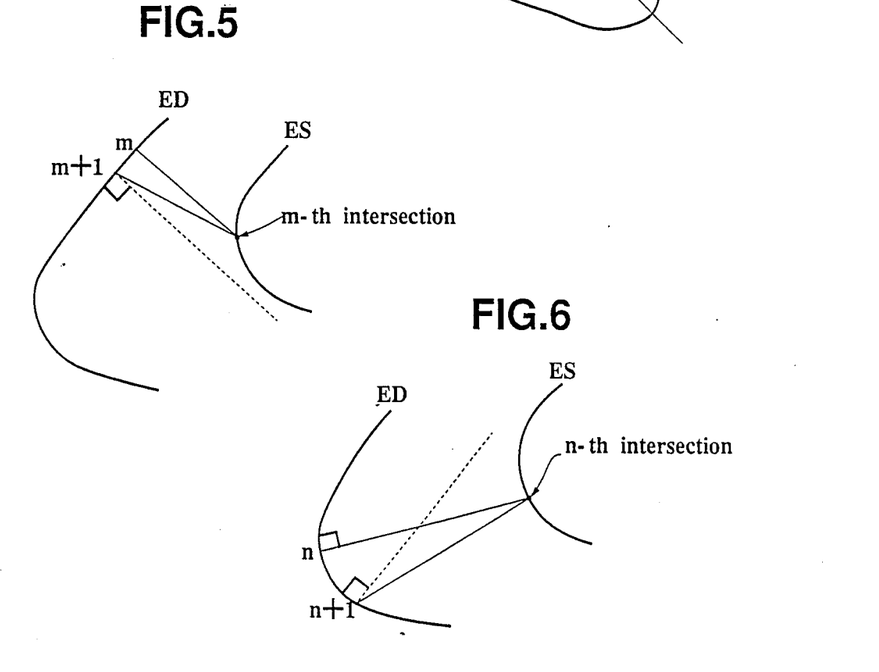
FIG. 5 is an illustration of the end-diastolic and end-systolic contours in the vicinity of the apex for explaining the steps in the flow chart of FIG. 1.
FIG. 6 is another illustration of the end-diastolic and end-systolic contours in the vicinity of the apex for explaining the steps in the flow chart of FIG. 1.

(3b) If a perpendicular line from (m+1)-th equidistant mark is not going to reach ES contour at all, as shown in FIG. 5, then instead of that perpendicular line, draw a line from that (m+1)-th equidistant mark to the m-th intersection of the previously drawn perpendicular line at the m-th equidistant mark and ES contour.

(3c) If a perpendicular line from (n+1)-th equidistant mark is going to intersect with the previously drawn perpendicular line from the n-th equidistant mark, as shown in FIG. 6, then instead of that perpendicular line, draw a line from that (n+1)-th equidistant mark to the n-th intersection of the previously drawn perpendicular line at the n-th equidistant mark and ES contour.

However, it has been found that these rules are not enough to produce sufficiently natural results, especially in the vicinity of the apex. Accordingly, the following additional rule is also taken into account in the method according to the present invention.

Figure 7:
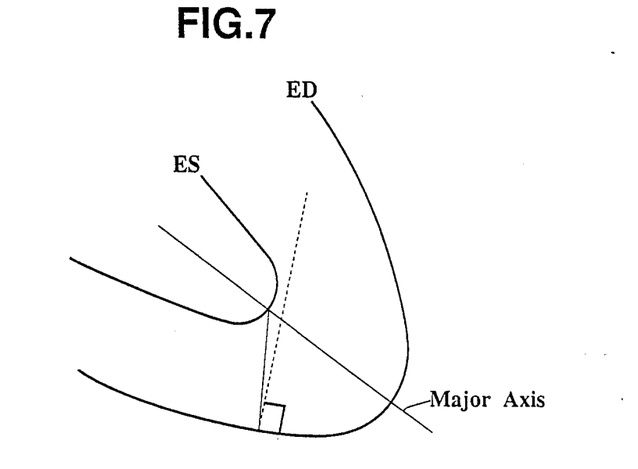
FIg. 7 is another illustration of the end-diastolic and end-systolic contours in the vicinity of the apex for explaining the steps in the flow chart of FIG. 1.

(3d) If a perpendicular line from a certain equidistant mark is going to intersect with a major axis joining the apex and the midpoint of the aortic valve portion of ED contour, as shown in FIG. 7, then instead of that perpendicular line, draw a line from that certain equidistant mark to the intersection of the major axis and ES contour.

Also, conventionally, the perpendicular lines are drawn sequentially in the clockwise or counter-clockwise direction around the entire ED contour. On the contrary, in the method according to the present invention, the next rule is adopted.

Figure 8:
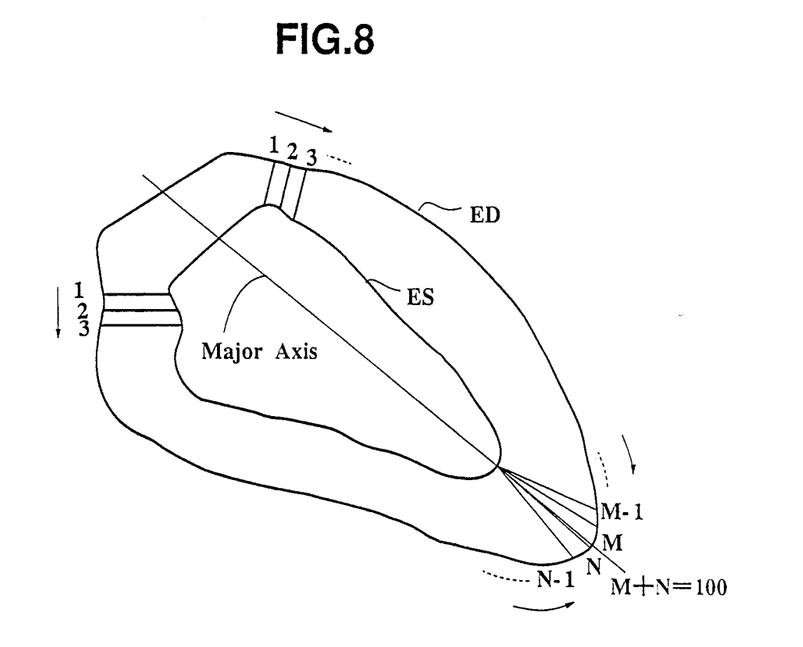
FIG. 8 is another illustration of the end-diastolic and end-systolic contours in the vicinity of the apex for explaining the steps in the flow chart of FIG. 1.

(3e) The perpendicular lines are to be drawn sequentially in a first direction from one end of the aortic valve portion toward the apex for one half of ED contour which is above the major axis, and in a second direction from the other end of the aortic valve portion toward the apex, which is opposite to the first direction, for other half of ED contour which is below the major axis, as shown in FIG. 8. Here, which side is above and which side is below with respect to the major axis is to be prescribed.

Thus, the drawing of the perpendicular lines at the step 30 is carried out in detail as follows, in accordance with the flow chart of FIG. 9.

First, at the step 301, the perpendicular line at a certain equidistant mark is considered. Then, at the step 302, whether this perpendicular line is going to reach ES contour is determined. If it is, then the step 303 is next. If not, then the step 306 is next.

At the step 303, whether this perpendicular line is going to reach the aortic valve portion of ES contour is determined. If it is, then the step 309 is next. If not, then the step 304 is next.

At the step 304, whether this perpendicular line is going to intersect with the previously drawn perpendicular line is determined. If it is, then the step 306 is next. If not, then the step 305 is next.

At the step 305, whether this perpendicular line is going to intersect with the major axis is determined. If it is, then the step 307 is next. If not, then the step 308 is next.

At the step 306, a line is drawn from that certain equidistant mark to the intersection of the previously drawn perpendicular line at the previous equidistant mark and ES contour. Then, the step 309 will be taken next.

At the step 307, a line is drawn from that certain equidistant mark to the intersection of the major axis and ES contour. Then, the step 309 will be taken next.

At the step 308, that perpendicular line for that certain equidistant mark is drawn between ED and ES contours. Then, the step 309 will be taken next.

At the step 309, whether all the equidistant marks are considered is determined. If so, the step 313 is next. If not, the step 310 is next.

At the step 310, whether that equidistant mark is above the major axis is determined. If it is, the step 311 is next. If not, the step 312 is next.

At the step 311, the process continues for the next equidistant mark in the clockwise direction, whereas at the step 312, the process continues for the next equidistant mark in the counter-clockwise direction.

When all the equidistant marks had been considered, the process terminates at the step 313.

Figure 9:
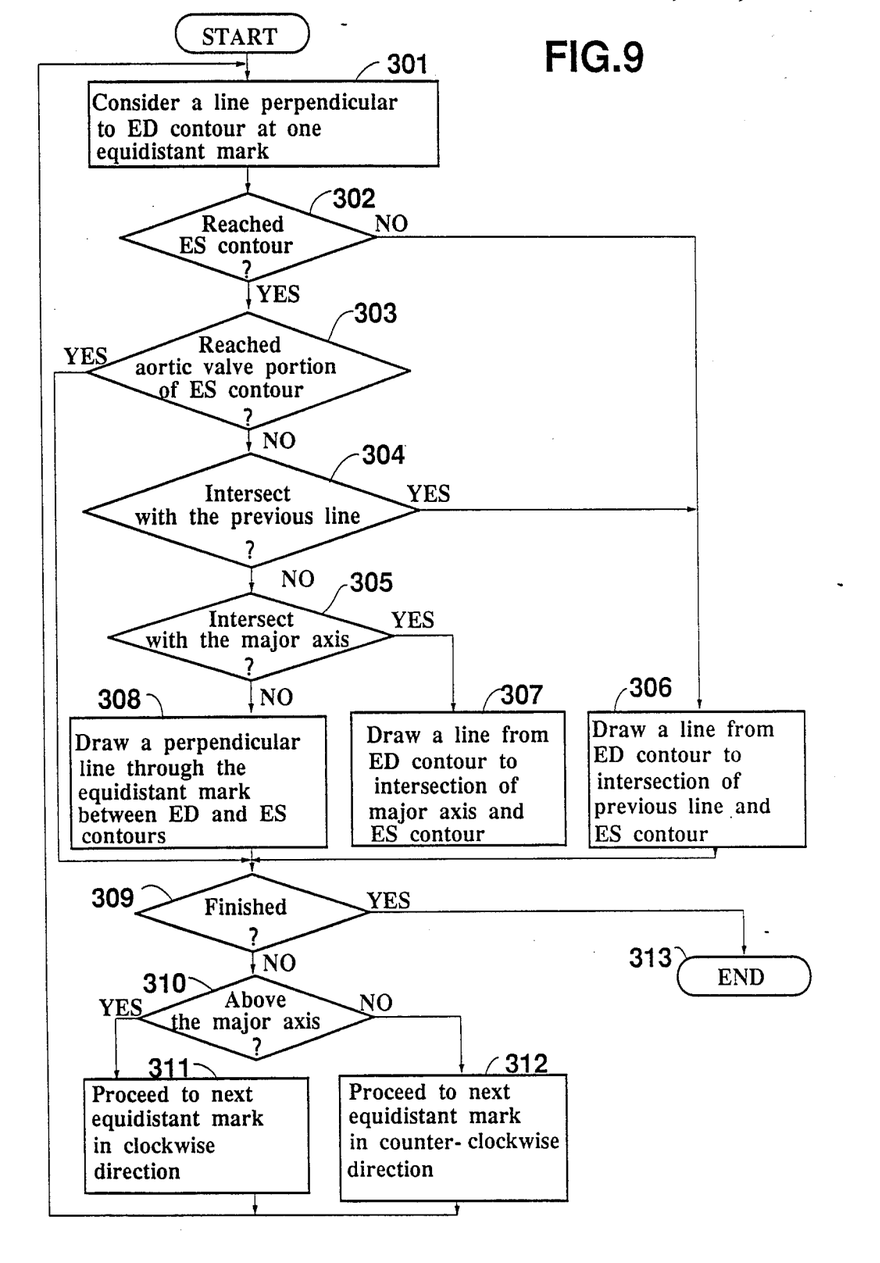
FIG. 9 is a detail flow chart for one step in the flow chart of FIG. 1.

After the completion of the step 30 in accordance with the flow chart of FIG. 9, the step 40 is next.

Figure 10:
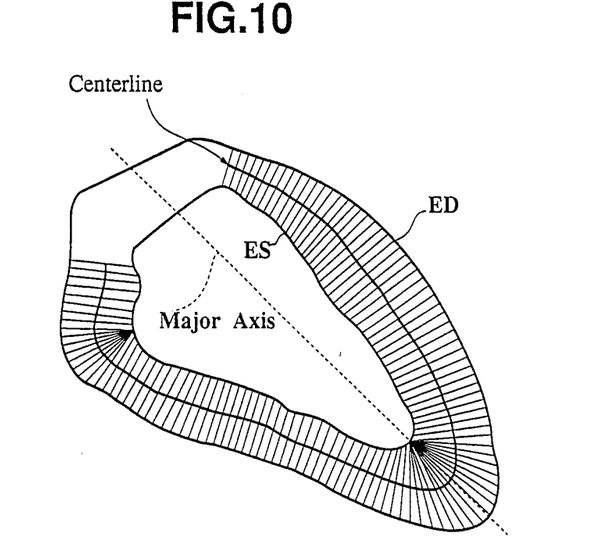
FIG. 10 is another illustration of the end-diastolic and end-systolic contours in the vicinity of the apex for explaining the steps in the flow chart of FIG. 1.

At the step 40, midpoints of the lines drawn at the step 30 are determined, and then the centerline passing through these midpoints is drawn, as shown in FIG. 10.

Figure 11:
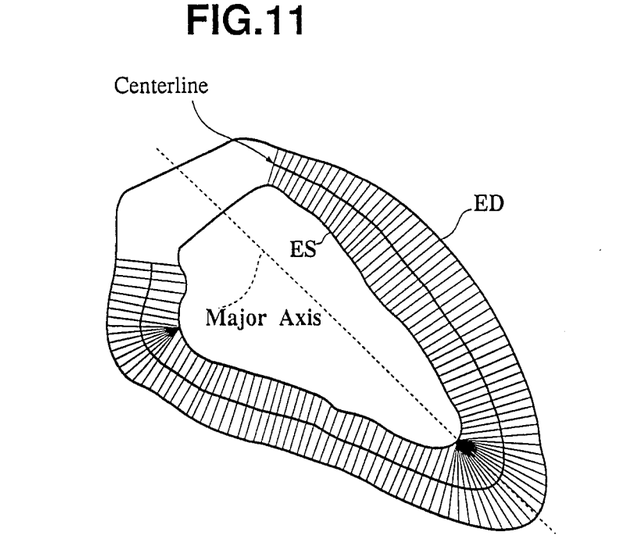
FIG. 11 is another illustration of the end-diastolic and end-systolic contours in the vicinity of the apex for explaining the steps in the flow chart of FIG. 1.

Then at the step 50, lines perpendicular to the centerline (referred hereafter as the motion path lines) at each of the midpoints are drawn between ED and ES contours, as shown in FIG. 11. This drawing of the motion path lines is carried out similarly to that of the perpendicular lines at the step 30.

Thus, the direction perpendicular to the centerline can be determined in various similar manners. One possible manner is to consider a circle passing through a certain midpoint and two adjacent midpoints in both sides, and then choose a direction normal to the circle at that certain midpoint as the direction perpendicular to the centerline. Another possible manner is to choose an average of the directions from a certain midpoint to 20 nearby midpoints as the direction perpendicular to the centerline.

Now, in drawing such motion path lines, cares similar to those for the step 30 must be taken. Namely, in the centerline method, these lines are regarded as indicating the motion paths of the regional wall motions, so that each one of these lines starting from ED contour must reach ES contour, in order to be realistic at all. Furthermore, none of these lines should reach the aortic valve portion of ES contour, and no intersection among any of these lines should exist.

To meet such requirements, the following three rules are normally taken into account.

(5a) If a motion path line through a certain midpoint is going to reach the aortic valve portion of ES contour, cf. FIG. 4, then do not draw that motion path line, skip that midpoint, and go to next midpoint.

(5b) If a motion path line through (m+1)-th midpoint is not going to reach ES contour at all, cf. FIG. 5, then instead of that motion path line, draw a line through that (m+1)-th midpoint to the m-th intersection of the previously drawn motion path line at the m-th midpoint and ES contour.

(5c) If a motion path line through (n+1)-th midpoint is going to intersect with the previously drawn motion path line through the n-th midpoint, cf. FIG. 6, then instead of that motion path line, draw a line through that (n+1)-th midpoint to the n-th intersection of the previously drawn motion path line at the n-th midpoint and ES contour.

However, as mentioned above, it has been found that these rules are not enough to produce sufficiently natural results, especially in the vicinity of the apex. Accordingly, the following additional rule is also taken into account in method according to the present invention.

(5d) If a motion path line from a certain midpoint is going to intersect with the major axis joining the apex and the midpoint of the aortic valve portion, cf. FIG. 7, then instead of that motion path line, draw a line from that certain midpoint to the intersection of the major axis and ES contour.

Also, conventionally, the motion path lines are drawn sequentially in the clockwise or counter-clockwise direction around the entire centerline. On the contrary, in the method according to the present invention, the next rule is adopted.

(3e) The motion path lines are to be drawn sequentially in a first direction from one end of the aortic valve portion toward the apex for one half of ED contour which is above the major axis, and in a second direction from the other end of the aortic valve portion toward the apex, which is opposite to the first direction, for other half of ED contour which is below the major axis, as shown in FIG. 8. Here, which side is above and which side is below with respect to the major axis is to be prescribed.

Thus, the drawing of the motion path lines at the step 50 is carried out in detail as follows, in accordance with the flow chart of FIG. 12.

First, at the step 501, the motion path line at a certain midpoint is considered. Then, at the step 502, whether this motion path line is going to reach ES contour is determined. If it is, then the step 503 is next. If not, then the step 506 is next.

At the step 503, whether this motion path line is going to reach the aortic valve portion of ES contour is determined. If it is, then the step 509 is next. If not, then the step 504 is next.

At the step 504, whether this motion path line is going to intersect with the previously drawn motion path line is determined. If it is, then the step 506 is next. If not, then the step 505 is next.

At the step 505, whether this motion path line is going to intersect with the major axis is determined. If it is, then the step 507 is next. If not, then the step 508 is next.

At the step 506, a line is drawn from that certain midpoint to the intersection of the previously drawn motion path line at the previous midpoint and ES contour. Then, the step 509 will be taken next.

At the step 507, a line is drawn from that certain midpoint to the intersection of the major axis and ES contour. Then, the step 509 will be taken next.

At the step 508, that motion path line for that certain midpoint is drawn between ED and ES contours. Then, the step 509 will be taken next.

At the step 509, whether all the midpoints are considered is determined. If so, the step 513 is next. If not, the step 510 is next.

At the step 510, whether that midpoint is above the major axis is determined. If it is, the step 511 is next. If not, the step 512 is next.

At the step 511, the process continues for the next midpoint in the clockwise direction, whereas at the step 512, the process continues for the next midpoint in the counter-clockwise direction.

When all the midpoints had been considered, the process terminates at the step 513.

Figure 12:
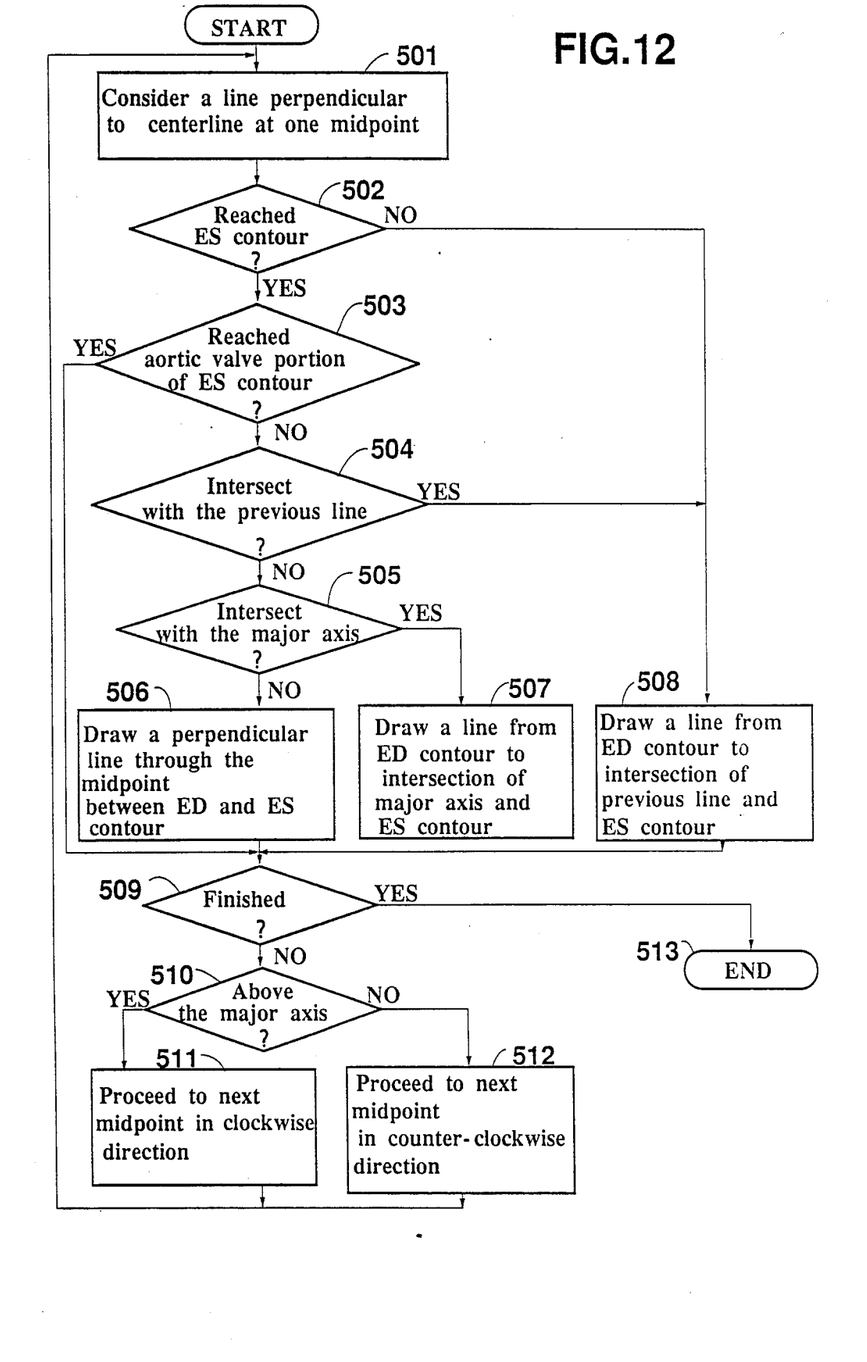
FIG. 12 is a detail flow chart for another step in the flow chart of FIG. 1.

After the completion of the step 50 in accordance with the flow chart of FIG. 12, the step 60 is next.

Figure 13:
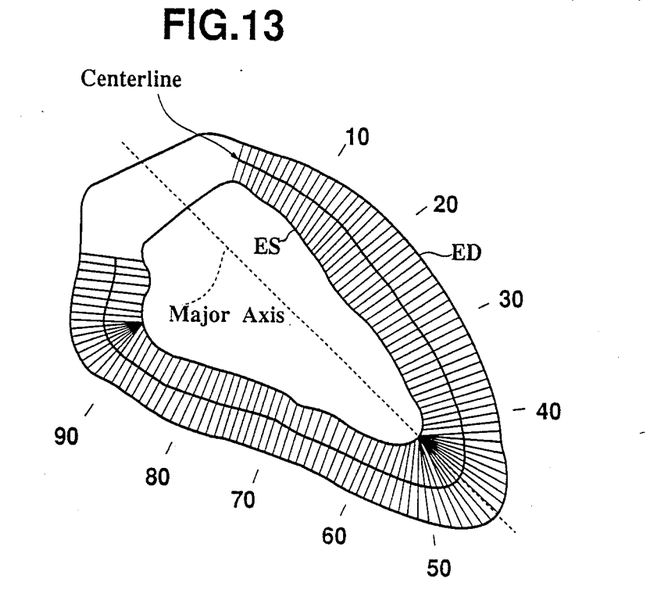
FIG. 13 is another illustration of the end-diastolic and end-systolic contours in the vicinity of the apex for explaining the steps in the flow chart of FIG. 1.

At the step 60, the chord numbers are given sequentially to the lines drawn at the step 50 in the clockwise direction, as shown in FIG. 13.

Figure 14:
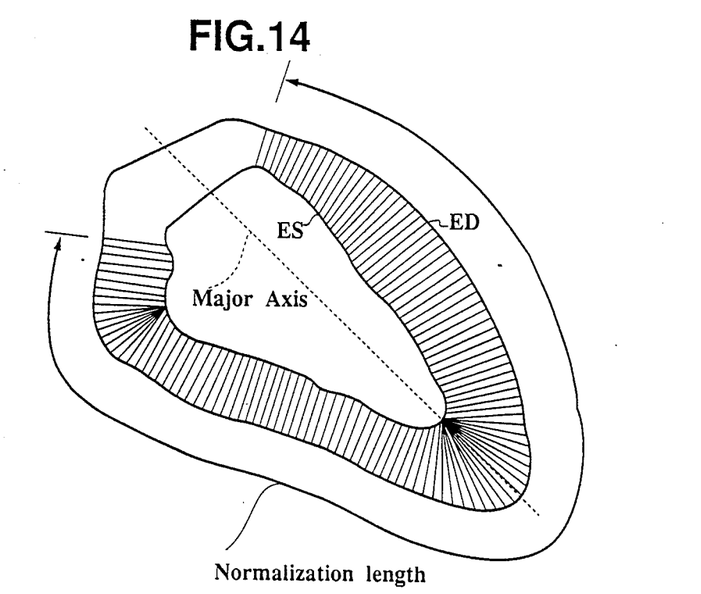
FIG. 14 is another illustration of the end-diastolic and end-systolic contours in the vicinity of the apex for explaining the steps in the flow chart of FIG. 1.

Next, at the step 70, lengths of the lines drawn at the step 50 are measured, then the measured lengths are normalized with respect to (i.e., divided by) a length of a part of ED contour where the motion path lines had been drawn, such as that shown in FIG. 14, and then signs are given to the normalized lengths such that a sign is positive when ED contour is outside of ES contour, and is negative otherwise. The results so obtained will be referred to as the normalized motions.

Figure 15:
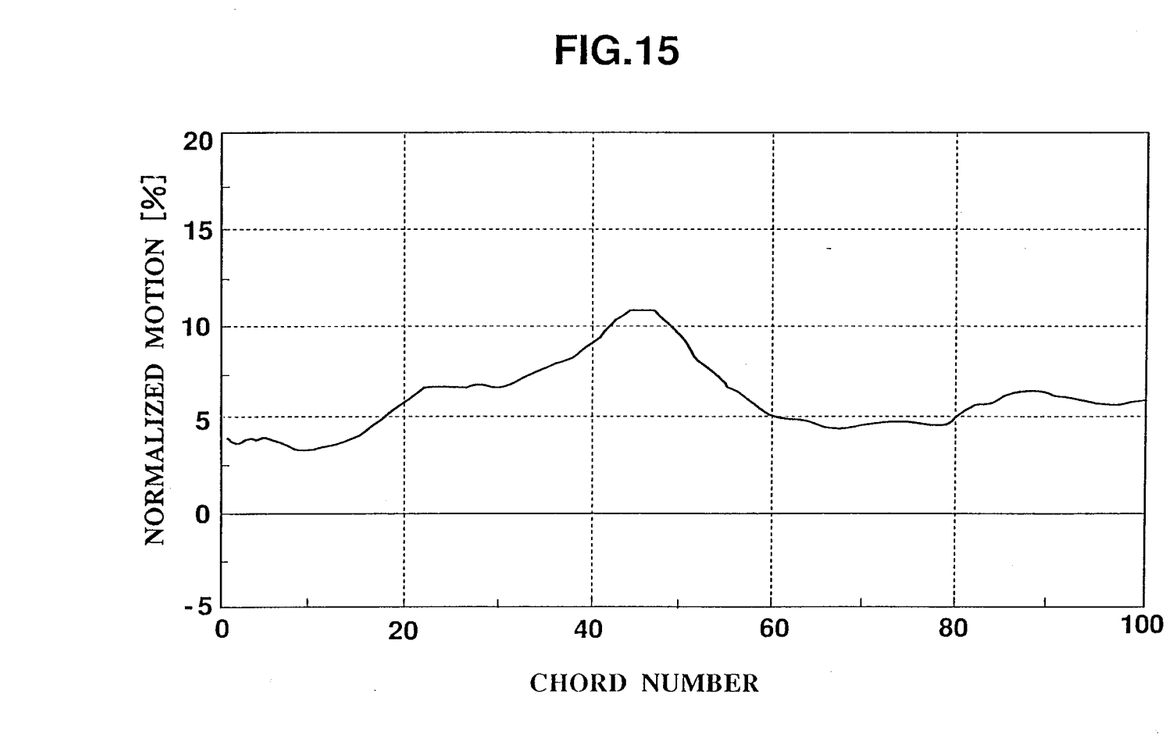
FIG. 15 is an example of a graph of normalized motion versus the chord numbers resulting from the centerline method, for explaining the steps in the flow chart of FIG. 1.

Finally, at the step 80, the normalized motions obtained at the step 70 are plotted against the chord numbers given at the step 60, as shown in FIG. 15.

The graph such as that shown in FIG. 15 resulting from the centerline method can provide variable information when the motions of different regions are compared, or when one for the patient with abnormal ventricular function is compared with one for the normal person. Further analysis such as expressing in terms of the standard deviation may also be carried out.

The effect of the new rules (3d), (3e), (5d), and (5e) added in the method according to the present invention is demonstrated for one example as follows.

Figure 16:
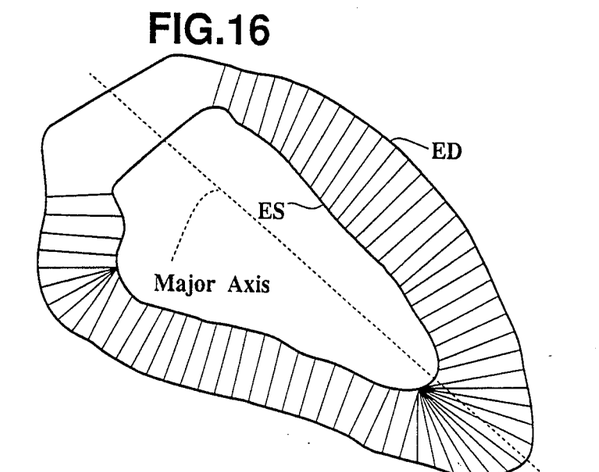
FIG. 16 is an illustration of the end-diastolic and end-systolic contours with lines drawn between, for explaining the effect of the method of analyzing regional ventricular function utilizing centerline method according to the present invention.

At the step 30, when the rule (3d) and (3e) are ignored (i.e., if the steps 305, 307, 310, 311, and 312 are skipped in the flow chart of FIG. 9), in which case the step 30 is basically carried out in the conventional manner, the result shown in FIG. 16 was obtained. As can be seen from FIG. 16, the perpendicular lines in the vicinity of the apex appear highly unnatural compared with the other parts. So the conventional manner of drawing the perpendicular lines can produce the result which erroneously indicate abnormality in the vicinity of the apex, which may lead to an incorrect diagnosis.

Figure 17:
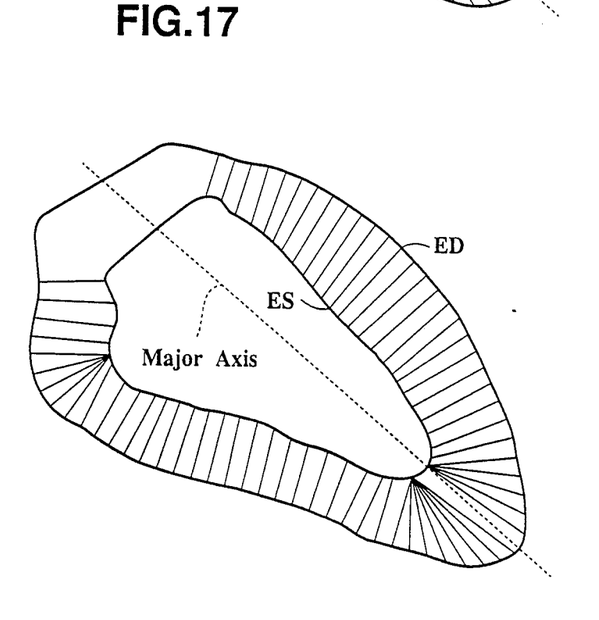
FIG. 17 is another illustration of the end-diastolic and end-systolic contours with lines drawn between, for explaining the effect of the method of analyzing regional ventricular function utilizing centerline method according to the present invention.

On the other hand, when the rule (3d) is added and only rule (3e) is ignored (i.e., if the steps 310, 311, and 312 are ignored in the flow chart of FIG. 9), then the result shown in FIG. 17 was obtained. As can be seen from FIG. 17, the perpendicular lines in the vicinity of the apex above the major axis in this case appear fairly natural compared with FIG. 16 because the perpendicular lines in the vicinity of the apex were made to converge to the intersection of the major axis and ES contour, but below the major axis the unnaturalness remains because the perpendicular lines in the vicinity of the apex do not converge to the intersection of the major axis and ES contour.

Figure 18:
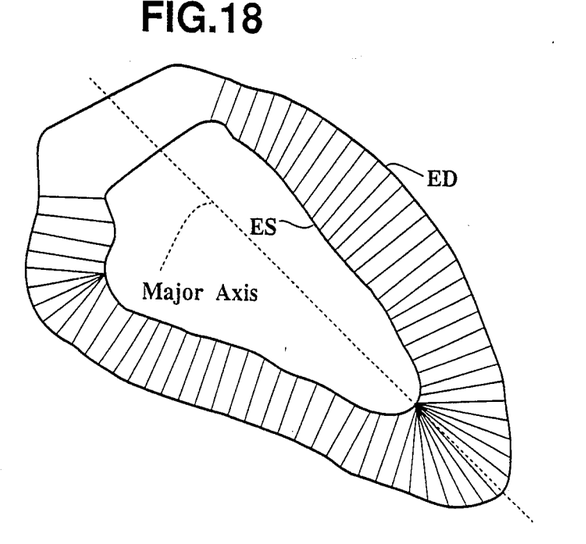
FIG. 18 is another illustration of the end-diastolic and end-systolic contours with lines drawn between, for explaining the effect of the method of analyzing regional ventricular function utilizing centerline method according to the present invention.

Finally, when both of the rules (3d) and (3e) were taken into account (i.e., in the method according to the present invention), the result shown in FIG. 18 was obtained. As can be seen from FIG. 18, the perpendicular lines in the vicinity of the apex in this case appear far more natural and therefore satisfactory than two previous cases.

Figure 19:
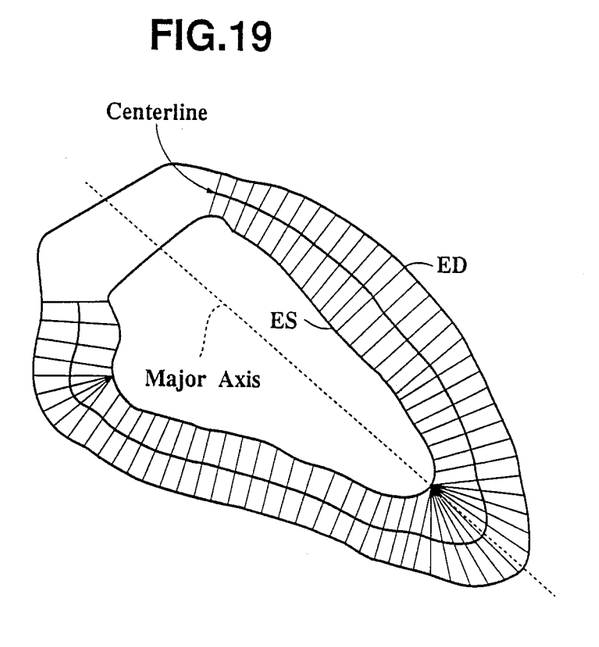
FIG. 19 is another illustration of the end-diastolic and end-systolic contours with lines drawn between, for explaining the effect of the method of analyzing regional ventricular function utilizing centerline method according to the present invention.

Similarly, for the step 50, sufficiently natural result shown in FIG. 19 can be obtained only by taking both of the rules (5d) and (5e).

As clearly demonstrated, the method according to the present invention can produce the result which is far more natural and satisfactory than that obtainable conventionally, especially in the vicinity of the apex, because of the ingenious rules incorporated into the steps of drawing perpendicular lines and motion path lines.

It is to be noted that many modifications and variations of this embodiment may be made without departing from the novel and advantageous features of the present invention. Accordingly, all such modifications and variations are intended to be included within the scope of the appended claims.

What is claimed is:

1. A method of analyzing regional ventricular function utilizing centerline method, comprising the steps of:

(a) drawing a first set of lines, which are perpendicular to end-diastolic contour, between end-diastolic and end-systolic contours;

(b) drawing a line between the end-diastolic and end-systolic contours, which is converging to an intersection of the end-systolic contour and a major axis joining an apex of the end-diastolic contour and a midpoint of an aortic valve portion of the end-diastolic contour, whenever a certain line to be drawn as one of the first set of lines is going to intersect with the major axis, as a replacement for that certain line;

(c) determining a centerline passing through midpoints of the lines drawn at the steps (a) and (b);

(d) drawing a second set of lines, which are perpendicular to the centerline, between the end-diastolic and end-systolic contours;

(e) drawing a line between the end-diastolic and end-systolic contours, which is converging to an intersection of the end-systolic contour and a major axis joining an apex of the end-diastolic contour and a midpoint of an aortic valve portion of the end-diastolic contour, whenever a certain line to be drawn as one of the second set of lines is going to intersect with the major axis, as a replacement for that certain line; and (f) analyzing regional ventricular function according to lengths of the lines drawn at the steps (d) and (e).

2. The method of claim 1, wherein the steps (a) and (d), the lines are drawn sequentially in a first direction from one end of an aortic valve portion toward an apex for one half of the end-diastolic contour, and in a second direction from another end of the aortic valve portion toward the apex, which is opposite to the first direction, for other half of the end-diastolic contour.

3. A method of analyzing regional ventricular function utilizing centerline method, comprising the steps of:

(a) drawing a first set of lines, which are perpendicular to end-diastolic contour, between end-diastolic and end-systolic contours, the lines being drawn sequentially in a first direction from one end of an aortic valve portion toward an apex for one half of the end-diastolic contour, and in a second direction from another end of the aortic valve portion toward the apex, which is opposite to the first direction, for other half of the end-diastolic contour;

(b) determining a centerline passing through midpoints of the first set of lines;

(c) drawing a second set of lines, which are perpendicular to the centerline, between the end-diastolic and end-systolic contours, the lines being drawn sequentially in a first direction from one end of an aortic valve portion toward an apex for one half of the end-diastolic contour, and in a second direction from another end of the aortic valve portion toward the apex, which is opposite to the first direction, for other half of the end-diastolic contour; and (d) analyzing regional ventricular function according to lengths of the second set of lines.

* * * * *